(12) United States Patent
Lee et al.

(10) Patent No.: US 9,225,248 B2
(45) Date of Patent: Dec. 29, 2015

(54) USING A DIGITAL DELAY LOCKED LOOP SYNCHRONOUS DIRECT CURRENT TO REDUCE THE ELECTROMAGNETIC INTERFERENCE-WAVE CONTROL METHOD OF A DC BUCK CONVERTER AND THE SWITCHING SIGNAL

(71) Applicant: Research & Business Foundation SUNGKYUNKWAN UNIVERSITY, Suwon-si (KR)

(72) Inventors: Kang Yoon Lee, Seoul (KR); Hong Jin Kim, Seoul (KR); Young Jun Park, Mungyeong-si (KR); Jeong Ah Jang, Seoul (KR); Nak Young Ko, Goyang-si (KR); Dong Hyeon Seo, Incheon (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 14/657,200

(22) Filed: Mar. 13, 2015

(65) Prior Publication Data

US 2015/0263625 A1   Sep. 17, 2015

(30) Foreign Application Priority Data

Mar. 14, 2014   (KR) .......................... 10-2014-0030622

(51) Int. Cl.
*H02M 3/156*   (2006.01)
*H02M 3/158*   (2006.01)

(52) U.S. Cl.
CPC ..................... *H02M 3/158* (2013.01)

(58) Field of Classification Search
CPC ... H02M 3/156; H02M 3/157; H02M 3/1588; H02M 2001/0009
USPC ................... 323/267, 282–285, 351
See application file for complete search history.

(56) References Cited

U.S. PATENT DOCUMENTS

| | | | | |
|---|---|---|---|---|
| 5,912,552 | A * | 6/1999 | Tateishi | H02M 3/1588 323/224 |
| 7,705,579 | B1 * | 4/2010 | Hariman | H02M 3/156 323/284 |
| 8,525,500 | B1 * | 9/2013 | Martin | H02M 3/156 323/283 |
| 2004/0183512 | A1 * | 9/2004 | McCune, Jr. | H02M 3/155 323/282 |
| 2005/0111149 | A1 * | 5/2005 | Motomori | H02H 7/1213 361/18 |
| 2008/0137379 | A1 * | 6/2008 | Mao | H02M 3/157 363/17 |
| 2012/0062190 | A1 * | 3/2012 | Haiplik | H02M 3/156 323/271 |
| 2014/0049994 | A1 * | 2/2014 | Ishii | H02M 1/36 363/49 |
| 2014/0152287 | A1 * | 6/2014 | Weng | H02M 1/36 323/311 |
| 2015/0008790 | A1 * | 1/2015 | Brubaker | B06B 1/0261 310/316.01 |

* cited by examiner

*Primary Examiner* — Adolf Berhane
(74) *Attorney, Agent, or Firm* — NSIP Law (57) ABSTRACT

A synchronous direct current (DC)-DC buck converter and a method of controlling the waveforms of switching signals disclosed herein. The synchronous DC-DC buck converter generates a stepped-down output voltage using a first switch configured to apply an input voltage to an inductor and a second switch configured to switch in response to a second switching signal. The synchronous DC-DC buck converter includes a sawtooth generation unit, a driver oscillating signal generation unit, a switching signal generation unit, and a phase tracking unit. The sawtooth generation unit generates a sawtooth wave. The driver oscillating signal generation unit generates an error voltage between the output voltage and a reference voltage, and compares the sawtooth wave with the error voltage, so as to generate a driver oscillating signal. The switching signal generation unit generates each of the first and second switching signals. The phase tracking unit generates the frequency setting signal.

8 Claims, 4 Drawing Sheets

USING A DIGITAL DELAY LOCKED LOOP SYNCHRONOUS DIRECT CURRENT TO REDUCE THE ELECTROMAGNETIC INTERFERENCE-WAVE CONTROL METHOD OF A DC BUCK CONVERTER AND THE SWITCHING SIGNAL

CROSS-REFERENCE TO RELATED APPLICATIONS

This application claims the benefit under 35 U.S.C. §119(a) of Korean Patent Application No. 10-2014-0030622, filed on Mar. 14, 2014, in the Korean Intellectual Property Office, the entire disclosure of which is incorporated herein by reference for all purposes.

BACKGROUND

1. Technical Field

The present invention relates to a direct current (DC)-DC converter and, more particularly, to a synchronous DC-DC buck converter.

2. Description of the Related Art

A DC-DC converter is a circuit that converts a DC voltage at one level into a DC voltage at another level. A DC-DC converter that converts an input voltage into an output voltage at a lower level and outputs the resulting voltage is referred to as a step-down DC-DC converter. An inductor-type buck converter also called a buck converter or a DC-DC buck converter is representative of the step-down DC-DC converter.

A synchronous DC-DC buck converter includes an inductor, two switches configured to operate in a complementary manner in order to control energy supply from input voltage and energy transfer to output voltage with respect to the inductor, and a capacitor configured to maintain a stepped-down voltage.

Theoretically, a synchronous DC-DC buck converter is a circuit in which a step-down ratio is determined based on the duty ratio of the one of two switches that applies an input voltage to an inductor, and thus is a DC-DC converter that can adjust the level of an output voltage using a simple structure.

However, since it is difficult to implement a high-capacity inductor and capacitor using integrated circuits, the inductor is implemented using an external element and only the remaining switching circuits are implemented in integrated circuits even when integrated circuits are used for implementation.

The size of an inductor is proportional to duty ratio and the difference between an input voltage and an output voltage, and is inversely proportional to switching frequency and the variation rate of the ripple current of the inductor upon switching.

Furthermore, the size of a capacitor is proportional to the variation rate of the ripple current of the inductor upon switching, and is inversely proportional to switching frequency and the magnitude of output voltage.

Accordingly, in order to reduce the sizes of an inductor and a capacitor and implement them in integrated circuits, switching frequency should be increased.

When switching frequency is increased, new problems occur in transistors implemented in integrated circuits in the form of switches. When the two switches of a synchronous DC-DC buck converter are simultaneously turned on, current may flow, or shoot-through, from an input voltage terminal through the switches to a ground terminal. Accordingly, it is necessary to lower the possibility that transistors operating as switches are simultaneously turned on at any time by applying predetermined dead time to head and tail of the complementary conductive time of each of the switches.

Another problem that occurs when switching frequency is increased is electromagnetic interference (EMI).

Since a switching signal is generated to have very stably maintained switching frequency, electromagnetic energy is concentrated on the switching frequency. Even when the voltage level of a switching signal is sufficiently low, a stable and high-frequency switching signal may cause noticeable electromagnetic interference within switching frequency band. Such electromagnetic interference sometimes affects the operations of other electronic devices, and even sometimes deteriorates the performance of a circuit itself.

In general, paradoxically, the possibility of the occurrence of electromagnetic interference based on a stable switching signal can be addressed by making the switching signal unstable. According to this technique, electromagnetic energy is spread over a wide band in which the switching signal is unstably generated, and thus a peak is lowered, with the result that the possibility of the occurrence of electromagnetic interference is eliminated. Such techniques are collectively referred to as "spread spectrum clock generation (SSCG).

However, it is difficult to apply a spread spectrum clock generation technique for eliminating electromagnetic interference to a synchronous DC-DC buck converter.

For example, dead time that is applied to head and tail of switching signal pulses may be problematic. Dead time should be chosen taking into account the turn-on time and turn-off time of a transistor that is used as a switch. For example, switching frequency can be increased by 10%, with the switching period shortened by 10%, according to application of spread spectrum clock, and then fixed dead time may be applied to, resulting that on-duty time of a switch that connects input power to the inductor shortens, shorter than the case in which switching frequency is not spread at all, and output voltage thus decreases.

In contrast, switching frequency can be decreased by 10% with a switching period increased by 10%, and then fixed dead time may be applied to, resulting that on-duty time of a switch that connects input power to the inductor lengthens, longer than the case where switching frequency is not spread at all, and output voltage thus increases.

In such a case, one can expect a problem that the output voltage of the DC-DC voltage converter is not stable and fluctuates with a period corresponding to the spread period of a spread spectrum clock.

SUMMARY

At least some embodiments of the present invention are directed to the provision of a synchronous DC-DC buck converter and a method of controlling the waveforms of switching signals, which are capable of reducing electromagnetic interference using a digital delay-locked loop.

At least some embodiments of the present invention are directed to the provision of a synchronous DC-DC buck converter and a method of controlling the waveforms of switching signals, which use a digital delay-locked loop and a spread spectrum clock in order to overcome the problem of electromagnetic interference whose influence increases as switching frequency increases.

At least some embodiments of the present invention are directed to the provision of a synchronous DC-DC buck converter and a method of controlling the waveforms of switching signals, which use a digital delay-locked loop in order to reduce influence on dead time and also maintain efficiency upon using a spread spectrum clock.

In accordance with an aspect of the present invention, there is provided a synchronous direct current (DC)-DC buck converter, the synchronous DC-DC buck converter generating a stepped-down output voltage using a first switch configured to apply an input voltage to an inductor during on-duty time of a first switching signal and a second switch configured to switch in response to a second switching signal complementary to the first switching signal, the synchronous DC-DC buck converter including: a sawtooth generation unit configured to generate a sawtooth wave based on a frequency according to a frequency setting signal; a driver oscillating signal generation unit configured to generate an error voltage between the output voltage and a reference voltage and to compare the sawtooth wave with the error voltage so as to generate a driver oscillating signal having a duty ratio corresponding to the magnitude of the error voltage; a switching signal generation unit configured to generate each of the first and second switching signals to have a waveform obtained by applying dead time to on-duty time of the driver oscillating signal; and a phase tracking unit configured to generate the frequency setting signal based on a sum signal obtained by summing an active time length signal of a pulse, corresponding to a phase difference between the driver oscillating signal and a reference clock signal, and a frequency variation signal based on a spread spectrum clock setting voltage.

The switching signal generation unit may operate to generate each of the first and second switching signals to have the waveform, obtained by applying the dead time to the on-duty time of the driver oscillating signal, in response to a dead time setting signal; and the phase tracking unit may operate to generate the dead time setting signal based on the sum signal obtained by summing the active time length signal of the pulse, corresponding to the phase difference between the driver oscillating signal and the reference clock signal, and the frequency variation signal based on the spread spectrum clock setting voltage.

The phase tracking unit may include: a pulse generation unit configured to generate a pulse corresponding to a phase difference between a divided signal, obtained by dividing the driver oscillating signal at a predetermined division ratio, and the reference clock signal; a time-to-digital converter configured to generate the active time length signal in accordance with a length of active time of the generated pulse; a spread spectrum clock control unit configured to generate the frequency variation signal based on the spread spectrum clock setting voltage; a summing unit configured to generate the sum signal by summing the active time length signal and the frequency variation signal; and a digital loop filter configured to filter the sum signal, to determine the magnitude of the frequency setting signal in proportion to the magnitude of the filtered sum signal, and to determine the magnitude of the dead time setting signal in inverse proportion to the magnitude of the filtered sum signal.

The frequency setting signal may be set to vary a frequency of the sawtooth wave in proportion to the spread spectrum clock setting voltage; and the dead time setting signal is set to vary the dead time length in inverse proportion to the spread spectrum clock setting voltage.

In accordance with another aspect of the present invention, there is provided a method of controlling switching control waveforms of a synchronous DC-DC buck converter, the synchronous DC-DC buck converter generating a stepped-down output voltage using a first switch configured to apply an input voltage to an inductor during on-duty time of a first switching signal and a second switch configured to switch in response to a second switching signal complementary to the first switching signal, the method including: generating a sawtooth wave based on a frequency according to a frequency setting signal; generating an error voltage between the output voltage and a reference voltage and comparing the sawtooth wave with the error voltage so as to generate a driver oscillating signal having a duty ratio corresponding to the magnitude of the error voltage; generating each of the first and second switching signals to have a waveform obtained by applying dead time to on-duty time of the driver oscillating signal; and generating the frequency setting signal based on a sum signal obtained by summing an active time length signal of a pulse, corresponding to a phase difference between the driver oscillating signal and a reference clock signal, and a frequency variation signal based on a spread spectrum clock setting voltage.

Generating each of the first and second switching signals may include generating each of the first and second switching signals to have the waveform, obtained by applying the dead time to the on-duty time of the driver oscillating signal, in response to a dead time setting signal; and the method further comprises generating the dead time setting signal based on the sum signal obtained by summing the active time length signal of the pulse, corresponding to the phase difference between the driver oscillating signal and the reference clock signal, and the frequency variation signal based on the spread spectrum clock setting voltage.

Generating the frequency setting signal and generating the dead time setting signal may include: generating a pulse corresponding to a phase difference between a divided signal, obtained by dividing the driver oscillating signal at a predetermined division ratio, and the reference clock signal; generating the active time length signal in accordance with a length of active time of the generated pulse; generating the frequency variation signal based on the spread spectrum clock setting voltage; generating the sum signal by summing the active time length signal and the frequency variation signal; and filtering the sum signal, determining the magnitude of the frequency setting signal in proportion to the magnitude of the filtered sum signal, and determining the magnitude of the dead time setting signal in inverse proportion to the magnitude of the filtered sum signal.

The frequency setting signal may be set to vary a frequency of the sawtooth wave in proportion to the spread spectrum clock setting voltage; and the dead time setting signal may be set to vary the dead time length in inverse proportion to the spread spectrum clock setting voltage.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and redundant descriptions of the same components will be omitted.

Figure 1:
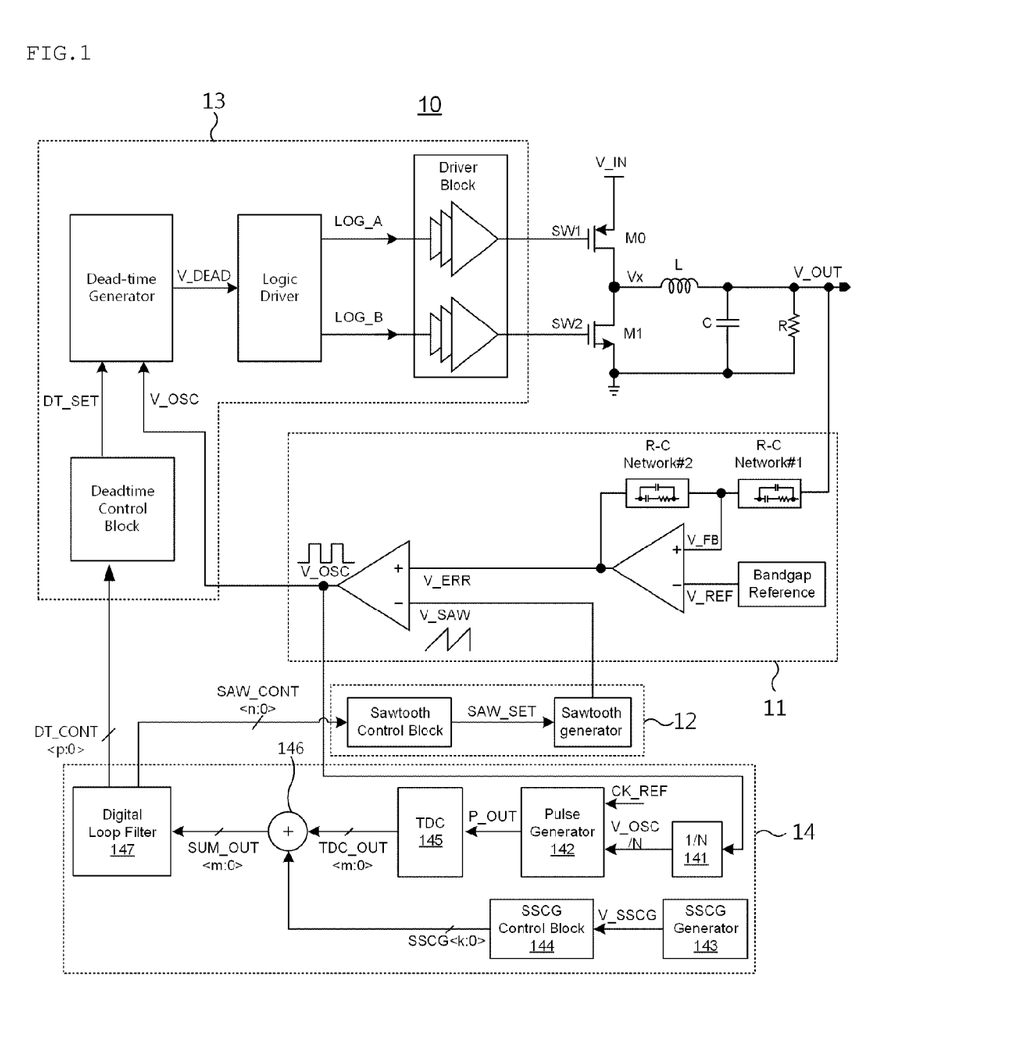
FIG. 1 is a block diagram illustrating a synchronous DC-DC buck converter using a digital delay-locked loop and a spread spectrum clock signal according to an embodiment of the present invention.

FIG. 1 is a block diagram illustrating a synchronous DC-DC buck converter using a digital delay-locked loop and a spread spectrum clock signal according to an embodiment of the present invention.

Referring to FIG. 1, the synchronous DC-DC buck converter 10 is a synchronous DC-DC buck converter that generates a stepped-down output voltage V_OUT using a first switch M0 configured to apply an input voltage V_IN to an inductor L during on-duty time of a first switching signal SW1, and a second switch M1 configured to switch in response to a second switching signal SW2 that is complementary to, or not-overlapping with, the first switching signal SW1.

For this, the synchronous DC-DC buck converter 10 may include a driver oscillating signal generation unit 11, a sawtooth generation unit 12, a switching signal generation unit 13, and a phase tracking unit 14.

The synchronous DC-DC buck converter 10 of FIG. 1 employs a feedback method that automatically adjusts the level of an output voltage V_OUT to a desired level by varying the on-duty times of the first and second switching signals SW1 and SW2 based on the level of the output voltage V_OUT.

If the level of the stepped-down output voltage V_OUT is higher than a desired level, on-duty time of the first switching signal SW1 during which the input voltage V_IN is applied to the inductor L is longer than meant to be. Accordingly, the duty interval of the first switching signal SW1 needs to be decreased, and on-duty of the second switching signal SW2 needs to be rather increased. In contrast, if the level of the stepped-down output voltage V_OUT is lower than the desired level, on-duty of the first switching signal SW1 needs to be increased, and on-duty interval of the second switching signal SW2 needs to be rather decreased.

The driver oscillating signal generation unit 11 generates drive an oscillation signal V_OSC, i.e., the basis of the determination of the duties of the first switching signal SW1 and the second switching signal SW2, based on the level of the output voltage V_OUT.

The driver oscillating signal generation unit 11 compares the stepped-down output voltage V_OUT with a reference voltage V_REF using an operational amplifier 111 and outputs an error voltage V_ERR and then compares the error voltage V_ERR with a sawtooth waveform V_SAW at a second comparator 112 so as to generate a pulse width-modulated driver oscillating signal V_OSC. The sawtooth waveform V_SAW may be generated by a sawtooth generator 113, having a frequency that is the same as the switching frequency of the first and second switching signals SW1 and SW2.

The duty ratio of the driver oscillating signal V_OSC is determined in accordance with the magnitude of the error voltage V_ERR, and the frequency thereof is the same as that of the first and second switching signals SW1 and SW2.

The reference voltage V_REF may be acquired from a well-known bandgap reference voltage (BGR) that is not influenced by operation voltage, temperature, and a process. In this case, since the reference voltage V_REF acquired from the bandgap reference voltage circuit normally has a level of about 1.25 V, the operational amplifier 111 whose amplification ratio has been determined such that the level of the output voltage V_OUT can be compared with level of the reference voltage V_REF.

If the level of a feedback voltage V_FB acquired from the output voltage V_OUT is higher than the predetermined reference voltage V_REF, the error voltage V_ERR will increase, and the duty ratio of the driver oscillating signal V_OSC also increases. In contrast, if the level of the feedback voltage V_FB acquired from the output voltage V_OUT is lower than the predetermined reference voltage V_REF, the error voltage V_ERR will decrease, and the duty ratio of the driver oscillating signal V_OSC also decreases.

The sawtooth generation unit 12 generates a sawtooth waveform V_SAW based on a sawtooth frequency SAW_SET set in response to a frequency setting signal SAW_CONT.

The switching signal generation unit 13 may generate the first and second switching signals SW1 and SW2 by applying a dead time waveform V_DEAD based on a predetermined dead time length DT_SET to head and tail of the on-duty time of the driver oscillating signal V_OSC in response to a dead time setting signal DT_CONT.

When the frequency of the driver oscillating signal V_OSC increases and thus on-duty time decreases, the dead time length DT_SET also decreases in proportion to the amount of decrement of the on-duty time. Accordingly, when the frequency of the driver oscillating signal V_OSC increases, the dead time waveform V_DEAD is shaped as getting closer together and the width of pulses getting narrower. In contrast, when the frequency of the driver oscillating signal V_OSC decreases, the dead time waveform V_DEAD is shaped as getting sparse and the width of pulses getting widened.

The phase tracking unit 14 may generate the frequency setting signal SAW_CONT and the dead time setting signal DT_CONT based on a sum signal SUM_OUT obtained by summing the active time length signal TDC_OUT of the pulse P_OUT, corresponding to the phase difference between the driver oscillating signal V_OSC and the reference clock signal CK_REF, and a frequency variation signal SSCG based on a spread spectrum clock setting voltage V_SSCG.

More specifically, the phase tracking unit 14 may include a pulse generation unit 142 configured to generate the pulse P_OUT corresponding to the phase difference between a divided signal V_OSC/N, obtained by dividing the driver oscillating signal V_OSC at a predetermined division ratio N using a frequency divider 141, and the reference clock signal CK_REF; a time-to-digital converter 145 configured to generate an active time length signal TDC_OUT in accordance with the length of the active interval of the generated pulse P_OUT; a spread spectrum clock control unit 144 configured to generate the frequency variation signal SSCG based on the spread spectrum clock setting voltage V_SSCG from a spread spectrum clock setting voltage generation unit 143; a summing unit 146 configured to generate the sum signal SUM_OUT by summing the active time length signal TDC_OUT and the frequency variation signal SSGC; and a digital loop filter 147 configured to filter the sum signal SUM_OUT, to determine the frequency setting signal SAW_CONT in proportion to the magnitude of the filtered sum signal, and to determine the magnitude of the dead time setting signal DT_CONT in inverse proportion to the magnitude of the filtered sum signal.

Figure 2:
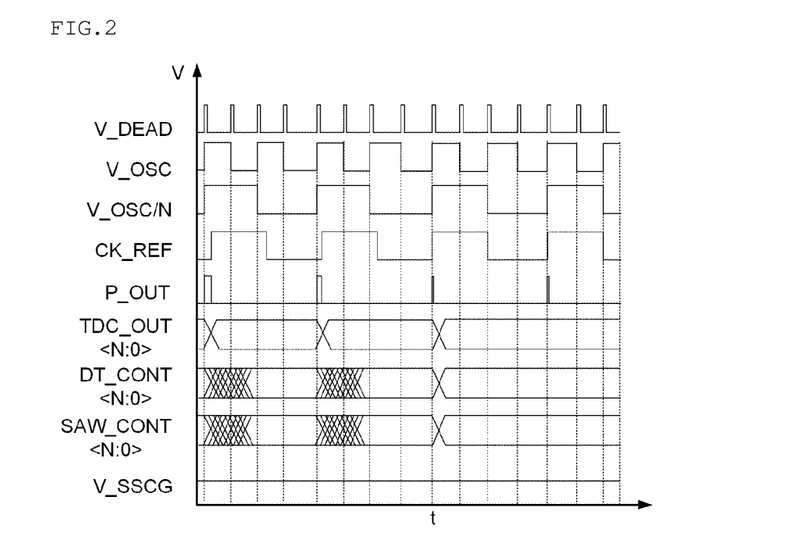
FIG. 2 is a timing chart illustrating the waveforms of control signals in a synchronous DC-DC buck converter using a digital delay-locked loop and a spread spectrum clock signal according to an embodiment of the present invention.

FIG. 2 is a timing chart illustrating the waveforms of control signals in a synchronous DC-DC buck converter using a digital delay-locked loop and a spread spectrum clock signal according to an embodiment of the present invention.

Referring to FIG. 2, at time T1, the spread spectrum clock setting voltage V_SSCG is kept constant, and the driver oscillating signal V_OSC slightly precedes the reference clock signal CK_REF in phase. The pulse output P_OUT generated by comparing the phase of the divided driver oscillating signal V_OSC/N with the phase of the reference clock signal CK_REF by the pulse generation unit 142 is generated to have a slight active interval. The active time length signal TDC_OUT is generated in accordance with the length of the active interval.

The frequency setting signal SAW_CONT in which the sawtooth frequency SAW_SET has been slightly decreased in order to the phase by which the driver oscillating signal V_OSC precedes the reference clock signal CK_REF is generated.

With regard to the dead time, since on-duty time of the driver oscillating signal V_OSC is slightly increased according to the amount of decrement of the sawtooth frequency SAW_SET, the dead time setting signal DT_CONT is generated so as to slightly increase the dead time length DT_SET.

At time T2, comparing phases with each other, the phase difference between the driver oscillating signal V_OSC and the reference clock signal CK_REF is slightly decreased, and the pulse output P_OUT generated by the pulse generation unit 142 is generated to have a shorter active interval. Accordingly, the sawtooth frequency setting signal SAW_CONT and the dead time setting signal DT_CONT are generated.

Figure 3:
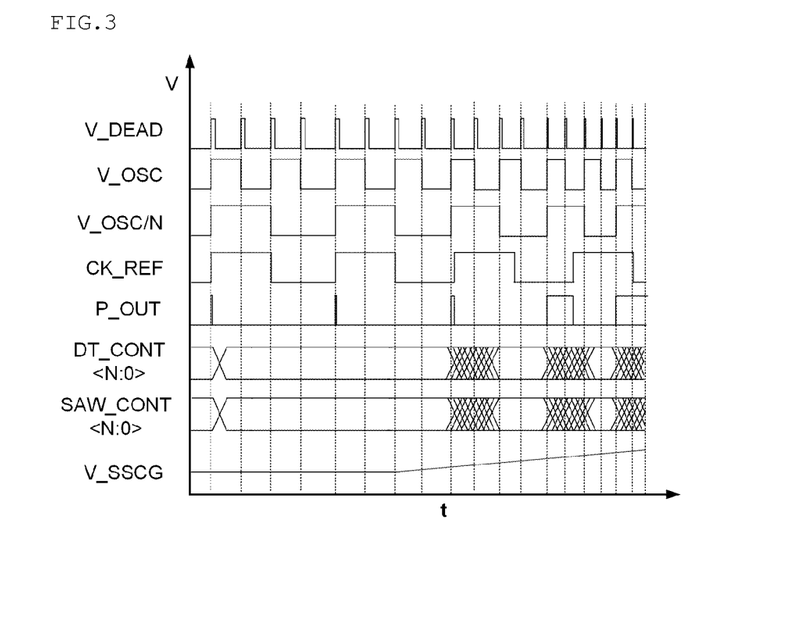
FIG. 3 is a timing chart illustrating the waveforms of control signals when the spread spectrum clock frequency increases in a synchronous DC-DC buck converter using a digital delay-locked loop and a spread spectrum clock signal according to an embodiment of the present invention.

FIG. 3 is a timing chart illustrating the waveforms of control signals when the spread spectrum clock frequency increases in a synchronous DC-DC buck converter using a digital delay-locked loop and a spread spectrum clock signal according to an embodiment of the present invention.

If an attempt is made to reduce electromagnetic interference using a spread spectrum clock signal, the spread spectrum clock setting voltage V_SSCG may increase or decrease compared to current in a spreading direction. In the case of upward spreading, the spread spectrum clock setting voltage V_SSCG will gradually increase.

Before time T1, the active time length signal TDC_OUT has little variation, and is stably generated. As the spread spectrum clock setting voltage V_SSCG is slightly increased at time T1 in order to reduce electromagnetic interference, the frequency variation signal SSGC is added to the active time length signal TDC_OUT and thus the sum signal SUM_OUT is increased. Accordingly, as the frequency setting signal SAW_CONT increases and the sawtooth frequency SAW_SET also increases, the period and duty width of the driver oscillating signal V_OSC decreases. At the same time, the dead time setting signal DT_CONT is varied such that the dead time length DT_SET decreases.

At time T2, as the spread spectrum clock setting voltage V_SSCG continues to increase, the frequency variation signal SSGC is added to the active time length signal TDC_OUT and thus the sum signal SUM_OUT is further increased. Accordingly, the frequency setting signal SAW_CONT increases and the sawtooth frequency SAW_SET increases, with the result that the period and duty width of the driver oscillating signal V_OSC is further decreased. The dead time setting signal DT_CONT continues to be varied such that the dead time length DT_SET is further decreased.

In this manner, the switching frequency can be increased and the dead time can be appropriately decreased by using the spread spectrum clock setting voltage V_SSCG.

Figure 4:
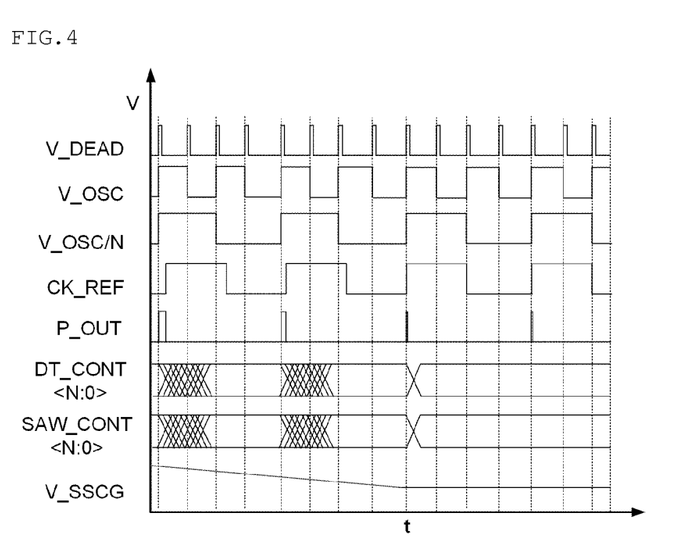
FIG. 4 is a timing chart illustrating the waveforms of control signals when the spread spectrum clock frequency decreases in a synchronous DC-DC buck converter using a digital delay-locked loop and a spread spectrum clock signal according to an embodiment of the present invention.

FIG. 4 is a timing chart illustrating the waveforms of control signals when the spread spectrum clock frequency decreases in a synchronous DC-DC buck converter using a digital delay-locked loop and a spread spectrum clock signal according to an embodiment of the present invention.

Referring to FIG. 4, this drawing illustrates a process in which the spread spectrum clock setting voltage V_SSCG spread upward returns to its basic frequency.

At time T1, the active time length signal TDC_OUT has a magnitude according to a slight phase difference. However, since the spread spectrum clock setting voltage V_SSCG is considerably high at time T1, the sum signal SUM_OUT obtained by adding the frequency variation signal SSCG to the active time length signal TDC_OUT has a high value. Accordingly, the frequency setting signal SAW_CONT and the dead time setting signal DT_CONT are set.

At time T2, as the spread spectrum clock setting voltage V_SSCG continues to drop, the dropped frequency variation signal SSGC is added to the active time length signal TDC_OUT and thus the sum signal SUM_OUT is further decreased. Accordingly, the magnitude of the frequency setting signal SAW_CONT decreases and the sawtooth frequency SAW_SET decreases, resulting that the period and duty width of the driver oscillating signal V_OSC is further increased. The dead time setting signal DT_CONT continues to be varied such that the dead time length DT_SET is increased.

In this manner, the switching frequency can be gradually decreased, and the dead time can be gradually increased by using the spread spectrum clock setting voltage V_SSCG.

Figure 5:
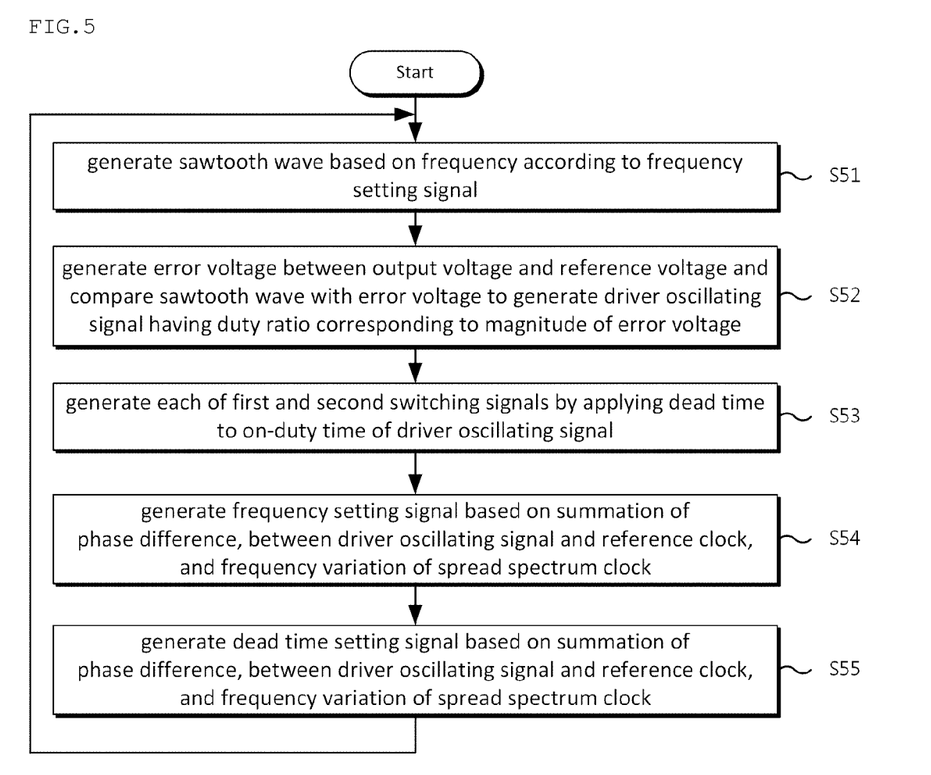
FIG. 5 is a flowchart illustrating a method of controlling the waveforms of switching signals for a synchronous DC-DC buck converter using a digital delay-locked loop and a spread spectrum clock signal according to an embodiment of the present invention.

FIG. 5 is a flowchart illustrating a method of controlling the waveforms of switching signals for a synchronous DC-DC buck converter using a digital delay-locked loop and a spread spectrum clock signal according to an embodiment of the present invention.

Referring to FIG. 5, a method of controlling switching waveforms of a synchronous DC-DC buck converter may start at step S51. The synchronous DC-DC buck converter 10 generates a stepped-down output voltage V_OUT using the first switch M0 configured to apply an input voltage V_IN to the inductor L during on-duty time of a first switching signal SW1 and the second switch M1 configured to switch in response to a second switching signal SW2 complementary to the first switching signal SW1.

At step S51, a sawtooth wave V_SAW is generated based on a frequency according to a frequency setting signal SAW_CONT.

At step S52, an error voltage V_ERR between an output voltage V_OUT and a reference voltage V_REF is generated, and a driver oscillating signal V_OSC having a duty ratio corresponding to the magnitude of the error voltage V_ERR is generated by comparing the sawtooth wave V_SAW with the error voltage V_ERR.

At step S53, the first and second switching signals SW1 and SW2 are respectively generated by using a waveform obtained by applying dead time to on-duty time of the driver oscillating signal V_OSC.

In some embodiments, at step S53, the first and second switching signals SW1 and SW2 may be each generated to have a waveform, obtained by applying the dead time to the on-duty time of the driver oscillating signal V_OSC, in response to a dead time setting signal DT_CONT.

At step S54, a frequency setting signal SAW_CONT is generated based on a sum signal SUM_OUT obtained by summing the active time length signal TDC_OUT of a pulse P_OUT, corresponding to the phase difference between the driver oscillating signal V_OSC and a reference clock signal CK_REF, and a frequency variation signal SSCG based on a spread spectrum clock setting voltage V_SSCG.

In some embodiments, at step S55, the dead time setting signal DT_CONT may be generated based on a sum signal SUM_OUT obtained by summing the active time length signal TDC_OUT of a pulse POUT, corresponding to the phase difference between the driver oscillating signal V_OSC and a reference clock signal CK_REF, and a frequency variation signal SSCG based on the spread spectrum clock setting voltage V_SSCG.

More specifically, the pulse P_OUT corresponding to the phase difference between a divided signal V_OSC/N, obtained by dividing the driver oscillating signal V_OSC at a predetermined division ratio N, and the reference clock signal CK_REF may be generated; an active time length signal TDC_OUT may be generated in accordance with the length of the active interval of the generated pulse P_OUT, the frequency variation signal SSCG based on the spread spectrum clock setting voltage V_SSCG may be generated, and the sum signal SUM_OUT may be generated by summing the active time length signal TDC_OUT and the frequency variation signal SSGC.

The sum signal SUM_OUT may be filtered, the magnitude of the frequency setting signal SAW_CONT may be determined in proportion to the magnitude of the filtered sum signal, and the magnitude of the dead time setting signal DT_CONT may be determined in inverse proportion to the magnitude of the filtered sum signal.

In other words, the frequency setting signal SAW_CONT may be set to vary the frequency SAW_SET of the sawtooth wave V_SAW in proportion to the spread spectrum clock setting voltage V_SSCG, and the dead time setting signal DT_CONT may be set to vary the dead time length DT_SET in inverse proportion to the spread spectrum clock setting voltage V_SSCG.

The synchronous DC-DC buck converter and the method of controlling the waveforms of switching signals according to at least some embodiments of the present invention can overcome the problem of electromagnetic interference whose influence increases as switching frequency increases.

The synchronous DC-DC buck converter and the method of controlling the waveforms of switching signals according to at least some embodiments of the present invention can reduce influence on dead time and also maintain efficiency upon using a spread spectrum clock.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

What is claimed is:

1. A synchronous direct current (DC)-DC buck converter, the synchronous DC-DC buck converter generating a stepped-down output voltage using a first switch configured to apply an input voltage to an inductor during on-duty time of a first switching signal and a second switch configured to switch in response to a second switching signal complementary to the first switching signal, the synchronous DC-DC buck converter comprising:
   a sawtooth generation unit configured to generate a sawtooth wave based on a frequency according to a frequency setting signal;
   a driver oscillating signal generation unit configured to generate an error voltage between the output voltage and a reference voltage and to compare the sawtooth wave with the error voltage, so as to generate a driver oscillating signal having a duty ratio corresponding to a magnitude of the error voltage;
   a switching signal generation unit configured to generate each of the first and second switching signals to have respectively a waveform obtained by applying dead time to on-duty time of the driver oscillating signal; and
   a phase tracking unit configured to generate the frequency setting signal based on a sum signal obtained by summing an active time length signal of a pulse, corresponding to a phase difference between the driver oscillating signal and a reference clock signal, and a frequency variation signal based on a spread spectrum clock setting voltage.

2. The synchronous DC-DC buck converter of claim 1, wherein:
   the switching signal generation unit operates to generate each of the first and second switching signals to have the waveform, obtained by applying the dead time to the on-duty time of the driver oscillating signal, in response to a dead time setting signal; and
   the phase tracking unit operates to generate the dead time setting signal based on the sum signal obtained by summing the active time length signal of the pulse, corresponding to the phase difference between the driver oscillating signal and the reference clock signal, and the frequency variation signal based on the spread spectrum clock setting voltage.

3. The synchronous DC-DC buck converter of claim 2, wherein the phase tracking unit comprises:
   a pulse generation unit configured to generate a pulse corresponding to a phase difference between a divided signal, obtained by dividing the driver oscillating signal at a predetermined division ratio, and the reference clock signal;
   a time-to-digital converter configured to generate the active time length signal in accordance with a length of an active interval of the generated pulse;
   a spread spectrum clock control unit configured to generate the frequency variation signal based on the spread spectrum clock setting voltage;
   a summing unit configured to generate the sum signal by summing the active time length signal and the frequency variation signal; and
   a digital loop filter configured to filter the sum signal, to determine a magnitude of the frequency setting signal in proportion to a magnitude of the filtered sum signal, and to determine a magnitude of the dead time setting signal in inverse proportion to the magnitude of the filtered sum signal.

4. The synchronous DC-DC buck converter of claim 2, wherein:
the frequency setting signal is set to vary a frequency of the sawtooth wave in proportion to the spread spectrum clock setting voltage; and
the dead time setting signal is set to vary the dead time length in inverse proportion to the spread spectrum clock setting voltage.

5. A method of controlling switching control waveforms of a synchronous DC-DC buck converter, the synchronous DC-DC buck converter generating a stepped-down output voltage using a first switch configured to apply an input voltage to an inductor during on-duty time of a first switching signal and a second switch configured to switch in response to a second switching signal complementary to the first switching signal, the method comprising:
generating a sawtooth wave based on a frequency according to a frequency setting signal;
generating an error voltage between the output voltage and a reference voltage, and comparing the sawtooth wave with the error voltage, so as to generate a driver oscillating signal having a duty ratio corresponding to a magnitude of the error voltage;
generating each of the first and second switching signals to have a waveform obtained by applying dead time to on-duty time of the driver oscillating signal; and
generating the frequency setting signal based on a sum signal obtained by summing an active time length signal of a pulse, corresponding to a phase difference between the driver oscillating signal and a reference clock signal, and a frequency variation signal based on a spread spectrum clock setting voltage.

6. The method of claim 5, wherein:
generating each of the first and second switching signals comprises generating each of the first and second switching signals to have the waveform, obtained by applying the dead time to the on-duty time of the driver oscillating signal, in response to a dead time setting signal; and
the method further comprises generating the dead time setting signal based on the sum signal obtained by summing the active time length signal of the pulse, corresponding to the phase difference between the driver oscillating signal and the reference clock signal, and the frequency variation signal based on the spread spectrum clock setting voltage.

7. The method of claim 6, wherein generating the frequency setting signal and generating the dead time setting signal comprise:
generating a pulse corresponding to a phase difference between a divided signal, obtained by dividing the driver oscillating signal at a predetermined division ratio, and the reference clock signal;
generating the active time length signal in accordance with a length of an active interval of the generated pulse;
generating the frequency variation signal based on the spread spectrum clock setting voltage;
generating the sum signal by summing the active time length signal and the frequency variation signal; and
filtering the sum signal, determining a magnitude of the frequency setting signal in proportion to a magnitude of the filtered sum signal, and determining a magnitude of the dead time setting signal in inverse proportion to the magnitude of the filtered sum signal.

8. The method of claim 6, wherein:
the frequency setting signal is set to vary a frequency of the sawtooth wave in proportion to the spread spectrum clock setting voltage; and
the dead time setting signal is set to vary the dead time length in inverse proportion to the spread spectrum clock setting voltage.

* * * * *